(12) United States Patent
Hayakawa et al.

(10) Patent No.: US 11,027,725 B2
(45) Date of Patent: Jun. 8, 2021

(54) SELF POSITION ESTIMATION METHOD AND SELF POSITION ESTIMATION DEVICE

(71) Applicant: Nissan Motor Co., Ltd., Yokohama (JP)

(72) Inventors: Yasuhisa Hayakawa, Kanagawa (JP); Ichiro Yamaguchi, Kanagawa (JP); Yasuhiro Sakurai, Kanagawa (JP); Daisuke Tanaka, Kanagawa (JP); Yukinori Nishida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/340,972

(22) PCT Filed: Oct. 13, 2016

(86) PCT No.: PCT/JP2016/080387
§ 371 (c)(1),
(2) Date: Apr. 10, 2019

(87) PCT Pub. No.: WO2018/070022
PCT Pub. Date: Apr. 19, 2018

(65) Prior Publication Data
US 2019/0283735 A1  Sep. 19, 2019

(51) Int. Cl.
*B60R 21/00* (2006.01)
*B62D 15/02* (2006.01)
(Continued)

(52) U.S. Cl.
CPC ............. *B60W 30/06* (2013.01); *B60R 21/00* (2013.01); *B60W 50/14* (2013.01);
(Continued)

(58) Field of Classification Search
CPC ...... B60W 30/06; B60W 50/14; B60W 40/02; G08G 1/16; G08G 1/168; B62D 15/0285;
(Continued)

(56) References Cited

U.S. PATENT DOCUMENTS 6,170,591 B1 * 1/2001 Sakai ................ B62D 15/0285
180/204
6,785,404 B1  8/2004 Shimazaki et al.
(Continued)

FOREIGN PATENT DOCUMENTS

CN  1591256 A  3/2005
CN  1737501 A  2/2006
(Continued)

*Primary Examiner* — Frederick M Brushaber
(74) *Attorney, Agent, or Firm* — Young Basile Hanlon & MacFarlane, P.C.

(57) ABSTRACT

A self position estimation method is provided which is capable of accurately estimating, when executing automatic parking to a parking target position using a stored surrounding situation, a position of a host vehicle or a target in the surrounding situation stored in a storage device. The method includes a step that presents the stored surrounding situation, a step that receives an operation of setting a positional relationship between the stored surrounding situation, and at least one of the host vehicle and the targets existing around the host vehicle, and a step that sets a position of at least one of the host vehicle and the target in the stored surrounding situation based on the operation.

7 Claims, 11 Drawing Sheets

(51) Int. Cl.
*G08G 1/16* (2006.01)
*B60W 50/14* (2020.01)
*G06T 7/70* (2017.01)
*B60W 40/02* (2006.01)
*B60K 35/00* (2006.01)
*B60W 30/06* (2006.01)

(52) U.S. Cl.
CPC ............ *B62D 15/0285* (2013.01); *G06T 7/70* (2017.01); *G08G 1/16* (2013.01); *G06T 2207/30244* (2013.01); *G06T 2207/30264* (2013.01)

(58) Field of Classification Search
CPC . B60R 21/00; G06T 7/70; G06T 2207/30264; G06T 2207/30244; B60Y 2300/06
See application file for complete search history.

(56) References Cited

U.S. PATENT DOCUMENTS

| | | | |
|---|---|---|---|
| 7,117,073 B2 | 10/2006 | Endo et al. | |
| 7,263,420 B2 | 8/2007 | Tanaka et al. | |
| 8,868,329 B2* | 10/2014 | Ikeda | B62D 15/0285 701/400 |
| 9,547,796 B2 | 1/2017 | Fukuda | |
| 2004/0260439 A1* | 12/2004 | Endo | B62D 15/0285 701/36 |
| 2004/0267420 A1* | 12/2004 | Tanaka | B62D 15/0285 701/36 |
| 2005/0043871 A1* | 2/2005 | Endo | G01S 5/16 701/36 |
| 2005/0049766 A1* | 3/2005 | Tanaka | B62D 15/0285 701/36 |
| 2005/0055139 A1* | 3/2005 | Tanaka | B62D 15/028 701/1 |
| 2007/0057816 A1* | 3/2007 | Sakakibara | B62D 15/0275 340/932.2 |
| 2007/0120656 A1* | 5/2007 | Nakanishi | H04N 7/18 340/435 |
| 2007/0279493 A1* | 12/2007 | Edanami | G08G 1/168 348/148 |
| 2008/0122654 A1* | 5/2008 | Sakakibara | G08G 1/168 340/932.2 |
| 2008/0258934 A1* | 10/2008 | Chemali | G08G 1/146 340/932.2 |
| 2010/0238051 A1* | 9/2010 | Suzuki | H04N 7/18 340/932.2 |
| 2012/0249342 A1* | 10/2012 | Koehrsen | G08G 1/16 340/904 |
| 2013/0116879 A1* | 5/2013 | Huger | B60W 30/06 701/23 |
| 2013/0166190 A1* | 6/2013 | Ikeda | B62D 15/0285 701/400 |
| 2014/0014433 A1* | 1/2014 | Kageyama | B62D 5/001 180/402 |
| 2014/0244070 A1* | 8/2014 | Inagaki | B62D 15/0285 701/1 |
| 2015/0035973 A1* | 2/2015 | Rammos | G01B 11/14 348/140 |
| 2015/0078624 A1* | 3/2015 | Fukuda | G08G 1/168 382/104 |
| 2015/0302574 A1* | 10/2015 | Muramatsu | B62D 15/0275 348/148 |
| 2016/0075327 A1* | 3/2016 | Kiyokawa | B62D 15/0285 701/301 |
| 2016/0313731 A1* | 10/2016 | Leppanen | B60K 35/00 |
| 2017/0203769 A1* | 7/2017 | Ohta | B60W 50/12 |
| 2017/0210291 A1* | 7/2017 | Nallapa | G07C 5/08 |
| 2020/0079360 A1* | 3/2020 | Tsujino | B60W 30/06 |

FOREIGN PATENT DOCUMENTS

| | | |
|---|---|---|
| EP | 1918173 A1 | 5/2008 |
| JP | H05-216407 A | 8/1993 |
| JP | 2004-291865 A | 10/2004 |
| JP | 2005-035498 A | 2/2005 |
| JP | 2005-041373 A | 2/2005 |
| JP | 2005-067565 A | 3/2005 |
| JP | 2007-237930 A | 9/2007 |
| JP | 2007-263844 A | 10/2007 |
| JP | 2013-209015 A | 10/2013 |
| JP | 5957745 B1 | 7/2016 |
| KR | 10-2015-0066182 A | 6/2015 |
| WO | 2015/092134 A1 | 6/2015 |

* cited by examiner

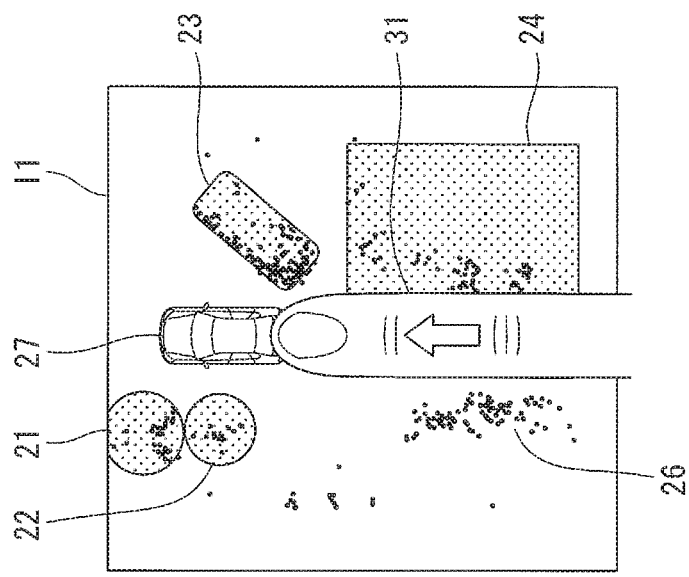
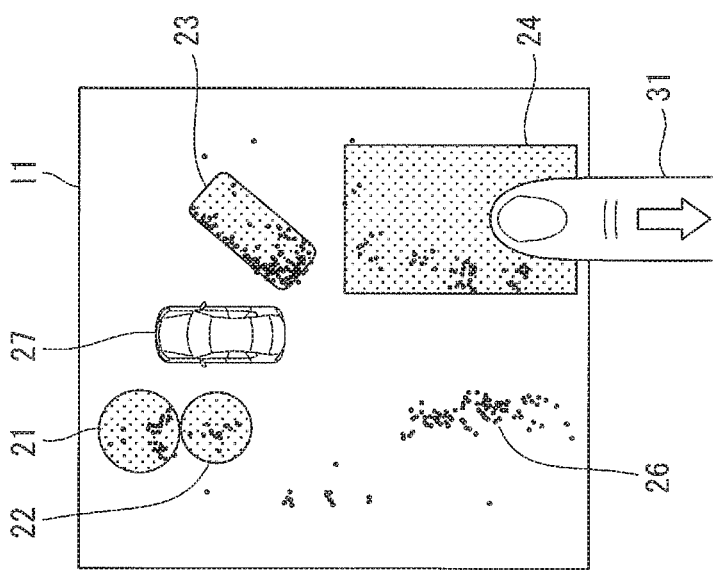
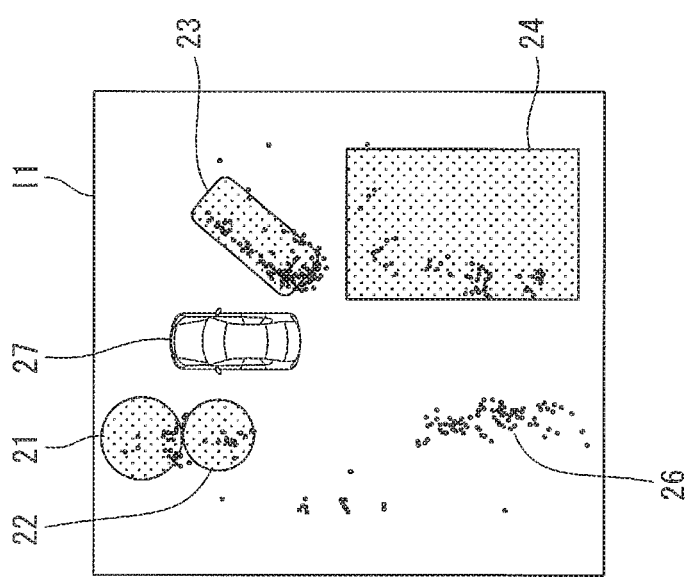

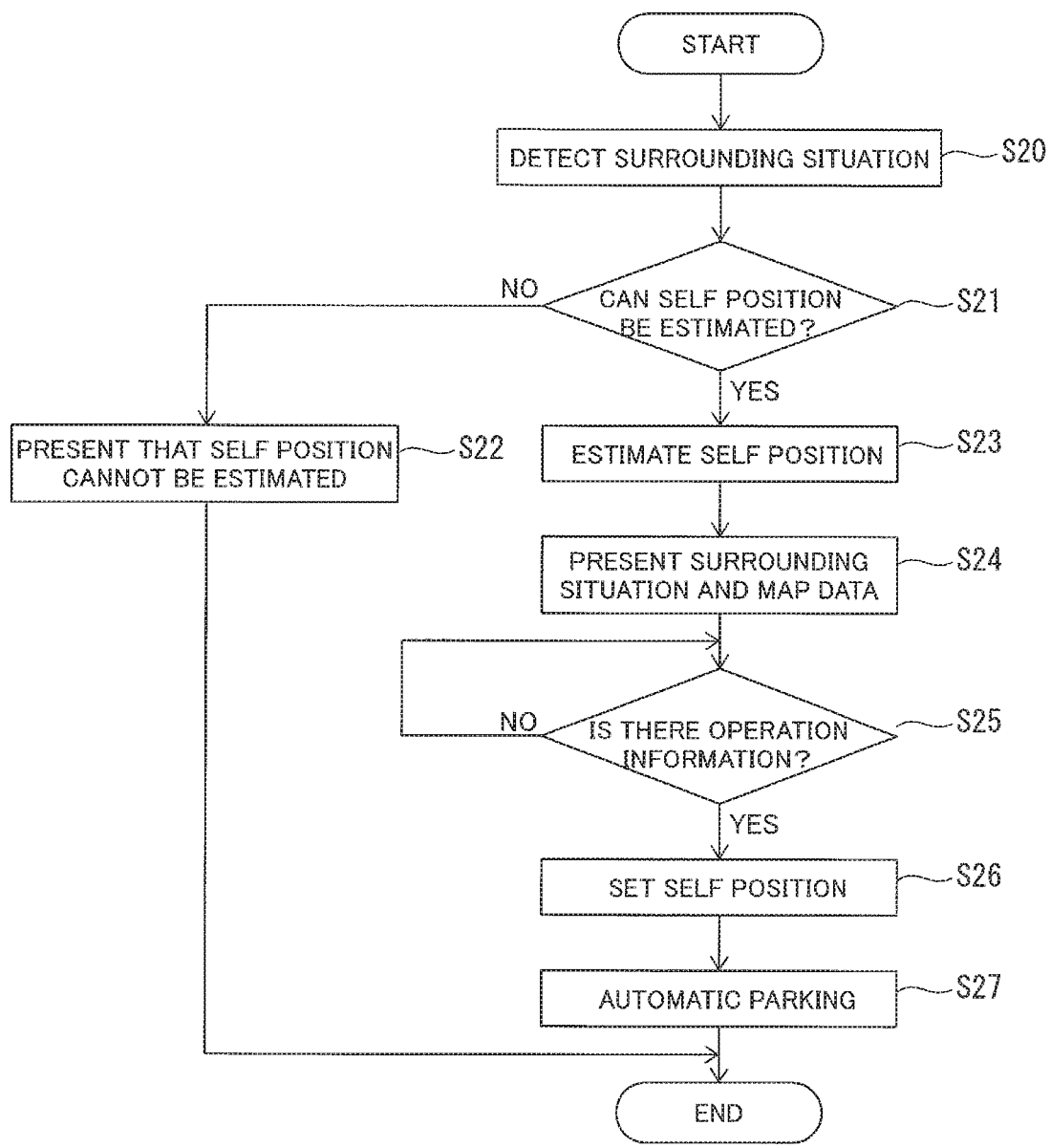

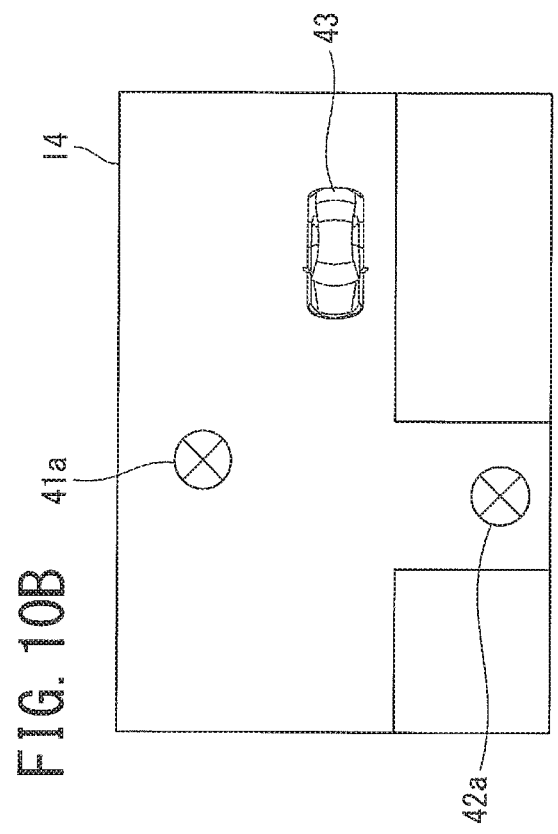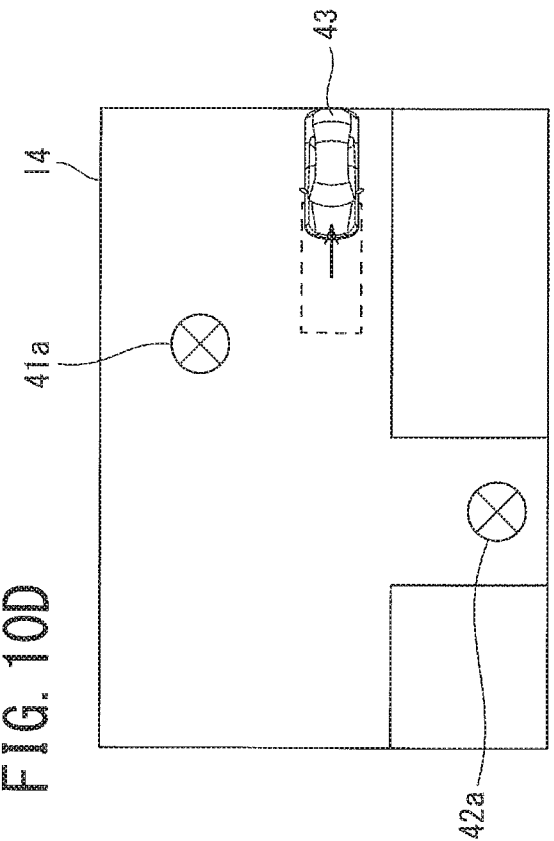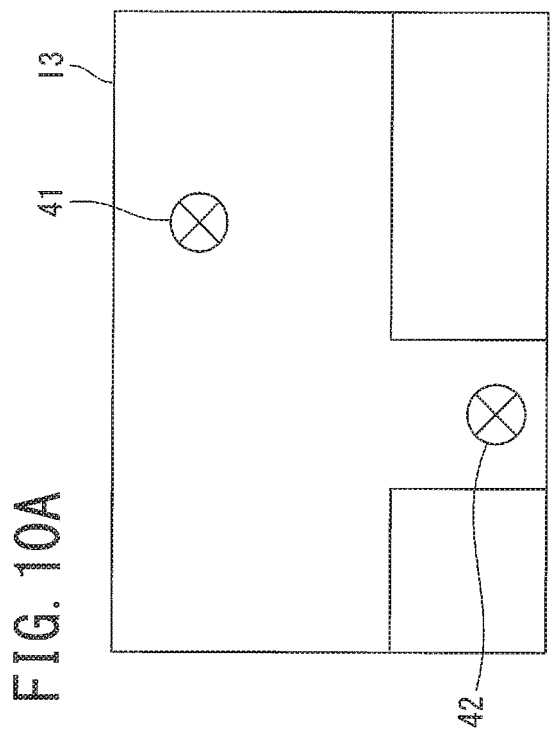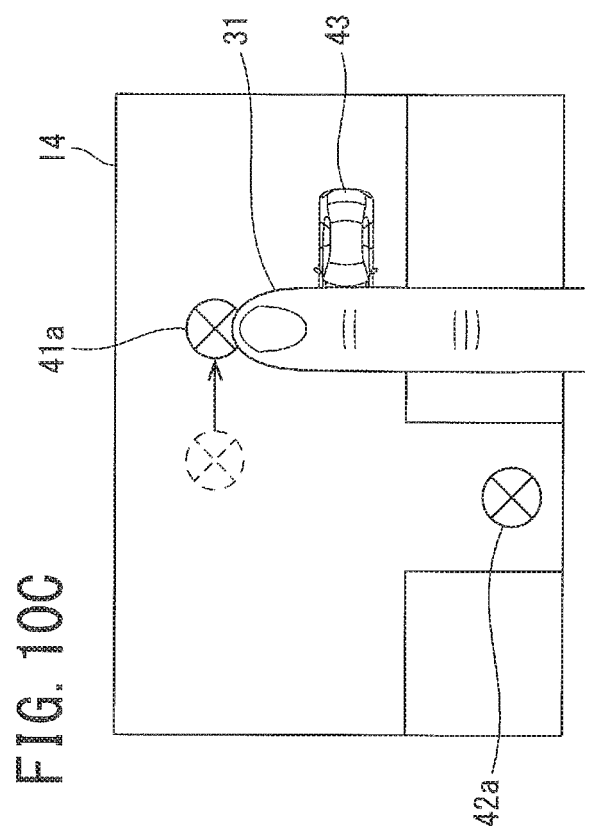

SELF POSITION ESTIMATION METHOD AND SELF POSITION ESTIMATION DEVICE

TECHNICAL FIELD

The present invention relates to a self position estimation method and a self position estimation device.

BACKGROUND

Conventionally, there is known a technique that includes positioning means that positions a position of a mobile body and sensor means that detects a movement state of the mobile body, and performs matching on a map based on a positioning result by the positioning means and a detection result by the sensor means to calculate a position of a host vehicle on the map (see JP 2007-263844 A).

SUMMARY

However, when using techniques described in JP 2007-263844 A to estimate a position of the host vehicle on the map when executing an automatic parking to a parking target position with reference to the map, an error may occur in the positioning result by the positioning means and the detection result by the sensor means depending on parking environment. Therefore, it may be difficult to accurately estimate the position of the host vehicle on the map.

In view of the aforementioned problem, the invention intends to provide a self position estimation method and a self position estimation device capable of accurately estimating, when executing automatic parking to a parking target position with reference to a stored surrounding situation of the parking target position, the position of the host vehicle or the target in the stored surrounding situation.

According to one aspect of the invention, when executing automatic parking to a parking target position with reference to a stored surrounding situation of the parking target position, the stored surrounding situation is presented. Then, a self position estimation method and a self position estimation device is characterized in that an operation of setting a positional relationship between the stored surrounding situation and a host vehicle or a target is received, and a position of the host vehicle or a position of the target in the stored surrounding situation is set based on the operation.

According to the invention, it is possible to provide a self position estimation method and a self position estimation device capable of accurately estimating, when executing automatic parking to a parking target position with reference to stored surrounding situation of the parking target position, a position of a host vehicle or a target in the stored surrounding situation.

BRIEF DESCRIPTION OF DRAWINGS

FIG. 4A is a schematic diagram illustrating an example of an image presented in a presentation unit according to the embodiment of the present invention;

FIG. 4B is a schematic diagram illustrating an example of an operation on the image presented in the presentation unit according to the embodiment of the present invention;

FIG. 4C is a schematic diagram illustrating another example of an operation on the image presented in the presentation unit according to the embodiment of the present invention;

FIG. 6 is a flowchart describing an example of a self position estimation method according to the embodiment of the present invention;

FIG. 10A is a schematic diagram illustrating an example of map data stored in a storage device according to a fourth modification of the embodiment of the present invention;

FIG. 10B is a schematic diagram illustrating an example of a detection result of a surrounding situation sensor according to the fourth modification of the embodiment of the present invention;

FIG. 10C is a schematic diagram illustrating an example of an operation on a detection result of the surrounding situation sensor according to the fourth modification of the embodiment of the present invention;

FIG. 10D is a schematic diagram illustrating an example of correction of the detection result of the surrounding situation sensor according to the fourth modification of the embodiment of the present invention;

DETAILED DESCRIPTION OF THE EMBODIMENTS

Figure 1:
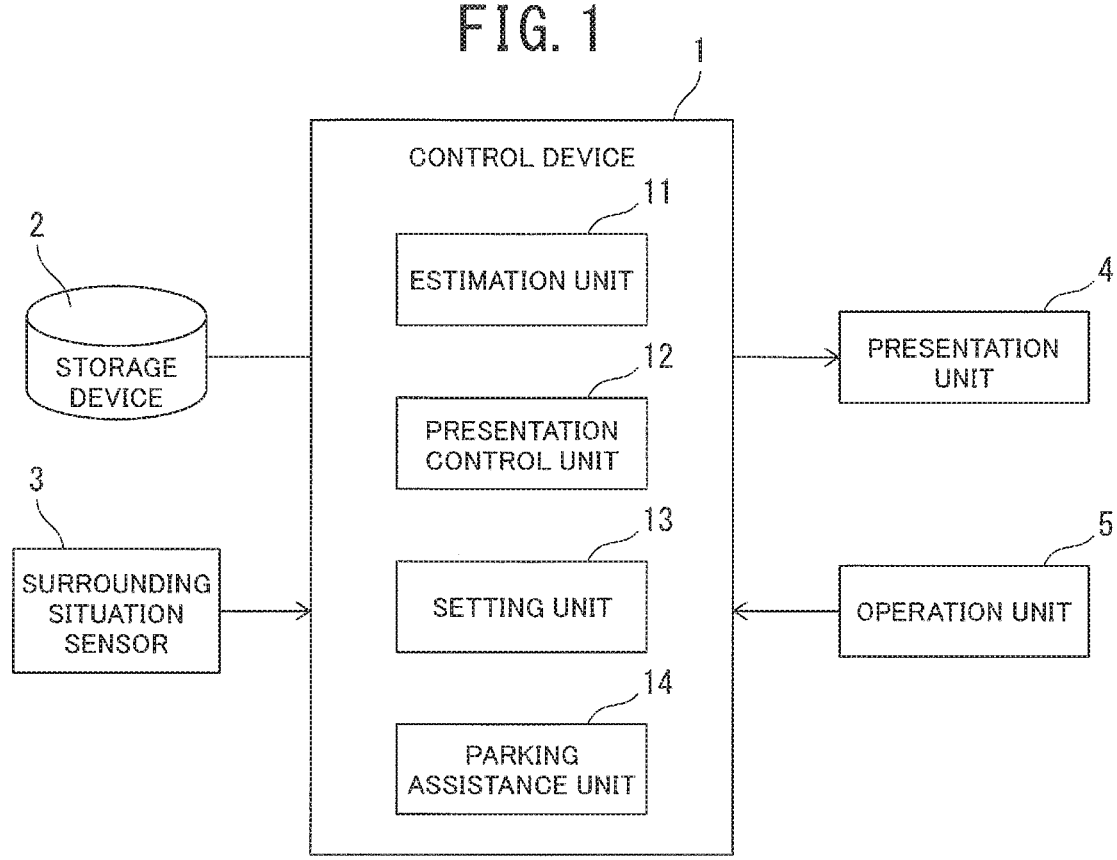
FIG. 1 is a block diagram illustrating an example of a self position estimation device according to an embodiment of the present invention.

Embodiments of the invention will be described below with reference to the drawings. In the following description of the drawings, the same or similar reference numerals are affixed to the same or similar parts. However, note that the drawings are schematic, a relationship between a thickness and a planar dimension, a thickness ratio and the like are different from actual ones. In addition, it is a matter of course that there exist portions in drawings where a relationship and a ratio of dimensions are different even between drawings. In addition, the embodiments described below are examples of devices and methods for embodying a technical idea of the invention, and the technical idea of the invention does not limit material, shape, structure, arrangement and the like of components to the following ones. The technical idea of the invention can be modified variously within the technical scope defined by the claims stated in the claims.

A self position estimation device according to an embodiment of the present invention can be used in a parking assistance device storing a surrounding situation of a parking target position in a storage device, and performing an automatic parking using the stored surrounding situation, and is directed to estimate a position (self position) and the like of a host vehicle in the stored surrounding situation. The self position estimation device according to the embodiment of the present invention can be mounted on a vehicle (hereinafter, the vehicle on which the self position estimation device according to the embodiment of the present invention is mounted is referred to as a "host vehicle"). As illustrated in FIG. 1, the self position estimation device according to the embodiment of the present invention includes a control device (controller) 1, a storage device 2, a surrounding situation sensor 3, a presentation unit 4, and an operation unit (interface) 5.

Figure 2:
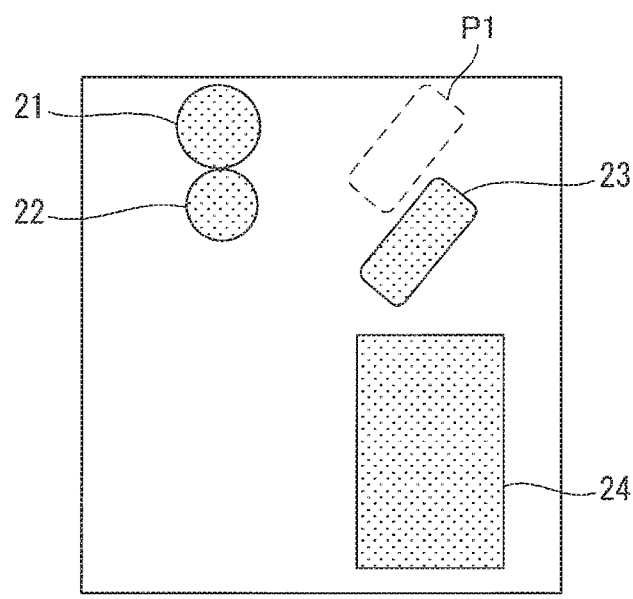
FIG. 2 is a schematic diagram illustrating an example of map data stored in a storage device according to the embodiment of the present invention.

The storage device 2 is constituted by a semiconductor storage device, a magnetic storage device, an optical storage device or the like, and can constitute a register, a cache memory, a main storage device and the like. The storage device 2 stores a surrounding situation of a parking target position referred to when executing an automatic parking to the parking target position. As illustrated in FIG. 2, the storage device 2 stores map data as an example of a surrounding situation of a parking target position P1. FIG. 2 illustrates a case where the map data is an overhead view image and a computer graphics (CG) image, but the invention is not limited thereto. The map data shows a positional relationship of targets 21, 22, 23 and 24 existing around the parking target position P1. The targets 21, 22, 23, and 24 include stationary standing objects (obstacles) such as markers, utility poles, walls, trees, and other vehicles parked, white lines on the road, parking frames, and the like. A range of the map data is not particularly limited and may be any range as long as automatic parking to the parking target position P1 is possible.

The surrounding situation of the parking target position such as the map data stored in the storage device 2 is obtained as a result of learning by detecting the surrounding situation of the parking target position using a surrounding situation sensor 3 during single parking or multiple parking. Here, the "single parking" includes, for example, an operation until the host vehicle reaches the parking target position. Further, even in a case where the host vehicle does not reach the parking target position, the "single parking" includes an operation of the host vehicle travelling around the parking target position and an operation until the host vehicle turns back around the parking target position, as long as the surrounding situation of the parking target position can be detected by the surrounding situation sensor 3.

In addition, the "multiple parking" means repeating the single parking, but the timing of repeating is not particularly limited, and for example, a second parking may be executed immediately after a first parking, and the second parking may be executed the day after the first parking is executed. Further, the multiple parking may be the same parking operation as each other or may be different parking operations from each other. For example, when the parking is executed twice, the first parking may be an operation until the host vehicle reaches the parking target position, and the second parking may be an operation of the host vehicle travelling around the parking target position. In a case where the multiple parking is repeated, map data with higher accuracy can be generated by integrating and supplementing the surrounding situation obtained for each parking.

The surrounding situation of the parking target position stored in the storage device 2 can be referred to during the subsequent or later parking. The timing of the "subsequent or later parking" is not particularly limited and includes, for example, the timing immediately after learning the surrounding situation of the parking target position and the timing since the day after the day when the surrounding situation of the parking target position is learned. Further, the parking operation of the "subsequent or later parking" includes operations of the host vehicle targeting the parking target position such as an operation of the host vehicle reaching the parking target position and an operation of the host vehicle travelling around the parking target position.

Figure 3:
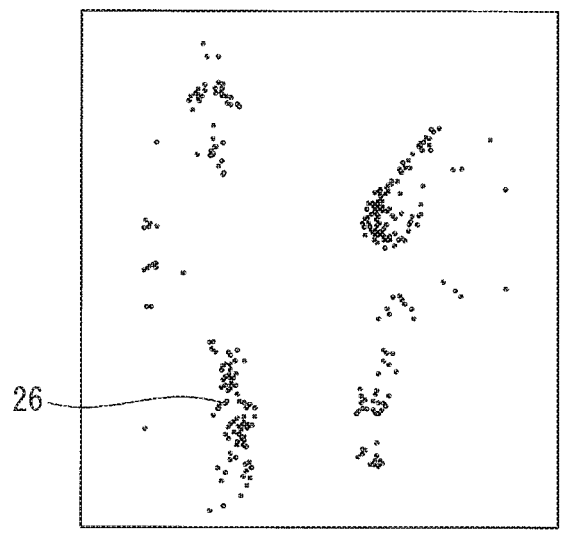
FIG. 3 is a schematic diagram illustrating an example of a detection result of a surrounding situation sensor according to the embodiment of the present invention.

The surrounding situation sensor 3 illustrated in FIG. 1 detects the surrounding situation of the host vehicle including a front, a side and a rear of the host vehicle. As the surrounding situation sensor 3, for example, a laser radar, a millimeter wave radar, a camera, a laser range finder (LRF), or the like can be used. The number, a type, and an arrangement position of the surrounding situation sensor 3 are not particularly limited, and for example, a plurality of the surrounding situation sensors 3 may be provided at the front, the side, and the rear of the host vehicle. FIG. 3 illustrates an example of the surrounding situation (point group data) of the host vehicle detected by the surrounding situation sensor 3, and a point group 26 in FIG. 3 indicates an edge position of the target (obstacle). The range of the point group data illustrated in FIG. 3 is substantially in common with the range of the map data illustrated in FIG. 2. Further, the range of the point group data illustrated in FIG. 3 may be narrower than the range of the map data illustrated in FIG. 2 or may be wider than the range of the map data illustrated in FIG. 2.

As the presentation unit 4 illustrated in FIG. 1, for example, a display such as a liquid crystal display can be used. The presentation unit 4 is installed at a position, such as an instrument panel in a vehicle interior, which is easily visible from an occupant. The operation unit 5 receives an operation from an occupant. The operation unit 5 may be a touch panel, a button or a switch of the presentation unit 4 or may be a button, a switch or the like provided on a center console or the like separately from the presentation unit 4.

The control device 1 is, for example, a controller such as an electronic control unit (ECU) and can be constituted by a computer including a central processing unit (CPU), a processor equivalent to a computer, or the like. The control device 1 may have a programmable logic device (PLD) such as a field programmable gate array (FPGA) or may be a functional logic circuit or the like set in a general purpose semiconductor integrated circuit.

The control device 1 functionally includes an estimation unit 11, a presentation control unit 12, a setting unit 13, and a parking assistance unit 14. The estimation unit 11 collates (matches) a position of the host vehicle and a position of the target in the surrounding situation of the host vehicle detected by the surrounding situation sensor 3 with the map data stored in the storage device 2, thereby estimating the position (self position) of the host vehicle and the position of the target on the map data. For example, the estimation unit 11 superimposes the map data illustrated in FIG. 2 and the surrounding situation of the host vehicle illustrated in FIG. 3 such that the corresponding targets 21, 22, 23, and 24 are matched. Then, the position (self position) of the host vehicle on the map data is estimated based on a relative positional relationship between the surrounding situation of the host vehicle and the host vehicle illustrated in FIG. 3. Here, depending on accuracy of the surrounding situation sensor 3, weather, sunlight condition, parking environment such as a multi-level parking lot, it is not possible to accurately match the surrounding situation of the host vehicle and the map data, and the position of the host vehicle on the map data may not be accurately estimated in some cases.

The presentation control unit 12 determines whether or not a predetermined specific target (for example, a point group corresponding to the target 24 in FIG. 2) has been detected as the surrounding situation of the host vehicle detected by the surrounding situation sensor 3, and presents a determination result to the occupant by voice or display. The specific target is a target that makes it easier to estimate the position of the host vehicle due to its position and shape, and can be set as appropriate. In a case where it is determined that the specific target has been detected, the fact that the specific target has been detected is presented to the occupant, whereby the occupant can grasp that the occupant is under an environment in which it is easy to estimate the position of the host vehicle. On the other hand, in a case where it is determined that the specific target has not been detected, the fact that the specific target has not been detected is presented to the occupant, whereby the occupant can grasp that the occupant is under an environment in which it is not easy to estimate the position of the host vehicle. Incidentally, as the specific target, only one target may be set, or a plurality of targets may be set. In a case where a plurality of targets are set, the presentation control unit 12 may determine whether or not all of the plurality of targets have been detected or determine whether or not a predetermined number or more of the plurality of targets has been detected.

As illustrated in FIG. 4A, the presentation control unit 12 causes the presentation unit 4 to present an image I1 obtained by collating (matching) the map data stored in the storage device 2 and the surrounding situation (point group data) of the host vehicle detected by the surrounding situation sensor 3. In the presentation unit 4, the entire map data may be presented or a part of the map data may be presented. In a case where a part of the map data is presented in the presentation unit 4, the map data may be scrollable vertically and horizontally. Likewise, the presentation unit 4 may present the entire surrounding situation of the host vehicle detected by the surrounding situation sensor 3 or may present a part of the surrounding situation. In a case where a part of the surrounding situation is presented in the presentation unit 4, the surrounding situation may be scrollable vertically and horizontally. Further, a size of the map data presented in the presentation unit 4 may be the same as a size of the surrounding situation or the sizes may be different from each other. For example, the entire surrounding situation may be superimposed on a part of the map data presented in the presentation unit 4. Alternatively, the entire map data may be superimposed on a part of the surrounding situation presented in the presentation unit 4.

Further, as illustrated in FIG. 4A, the presentation control unit 12 causes a simulation vehicle (icon) 27 to be presented at the position of the host vehicle on the map data estimated by the estimation unit 11. Incidentally, since it is sufficient for the occupant to identify the position of the host vehicle on the map data estimated by the estimation unit 11, a figure such as a rectangle, without being limited to the simulation vehicle 27, may be presented in the presentation unit 4.

Further, the presentation control unit 12 may request the occupant to operate by presenting character information and audio information such as "please align positions of the map data and the surrounding situation" or "please align positions of the map data and the icon" to the occupant.

When the image I1 illustrated in FIG. 4A is presented in the presentation unit 4, the operation unit 5 receives from the occupant an operation of setting (adjusting) a positional relationship between the map data and at least one of the positions of the host vehicle and the target existing around the host vehicle. For example, in a case where the operation unit 5 is a touch panel, as illustrated in FIG. 4B, the occupant touches and scrolls the target 24 on the map data in the direction of an arrow (downward) with a finger 31, whereby the entire map data including the targets 21, 22, 23 and 24 is shifted downward. As a result, it is possible to match the targets 21, 22, 23 and 24 on the map data and the corresponding point group 26. Further, in a case where an orientation of the map data and an orientation of the surrounding situation of the host vehicle are deviated from each other, the entire map data may be rotated by an operation such as rotating two fingers in contact with an arbitrary position on the map data.

Further, as illustrated in FIG. 4C, the occupant may touch and scroll the simulation vehicle 27 in the direction of the arrow (upward) with the finger 31, thereby shifting the simulation vehicle 27 and the entire surrounding situation of the host vehicle upward. Since the position of the host vehicle corresponding to the position of the simulation vehicle 27 is obtained from a positional relationship relative to the surrounding situation of the host vehicle, the surrounding situation of the host vehicle also moves as the simulation vehicle 27 moves. As a result, it is possible to match the targets 21, 22, 23, and 24 on the map data and the corresponding point group 26. In addition, the occupant may shift the simulation vehicle 27 and the entire surrounding situation of the host vehicle by touching and scrolling an arbitrary position of the point group 26, which is the surrounding situation of the host vehicle, with the finger 31.

Incidentally, instead of touching and scrolling the simulation vehicle 27, the occupant may directly set the position of the host vehicle on the map data by touching the position of the host vehicle on the map data. In a case where the operation unit 5 is not a touch panel but a button, the simulation vehicle 27 may be moved by pressing the button. As described above, the operation method of setting the positional relationship between the map data and the surrounding situation of the host vehicle or the host vehicle is not particularly limited, and various methods can be adopted. In addition, the operation method of setting the positional relationship between the map data and the surrounding situation of the host vehicle or the host vehicle may be set in advance or may be selectable by operation of the operation unit 5 as appropriate.

The setting unit 13 sets at least one of the position of the host vehicle and the position of the target on the map data based on operation information for setting the positional relationship between the map data and the surrounding situation of the host vehicle or the host vehicle. For example, as illustrated in FIG. 4B, in a case where the occupant executes an operation of setting a positional relationship between the map data and the surrounding situation of the host vehicle, the setting unit 13 corrects the result of collating (matching) the surrounding situation of the host vehicle and the map data by the estimation unit 11 to be a positional relationship corresponding to FIG. 4B. Further, the setting unit 13 corrects the position of the host vehicle estimated by the estimation unit 11 based on the corrected collating (matching) result. Further, as illustrated in FIG. 4C, in a case where the occupant executes an operation of setting the positional relationship between the map data and the host vehicle, the setting unit 13 corrects the position of the host vehicle on the map data estimated by the estimation unit 11 to be a position corresponding to FIG. 4C.

For example, in a case where the positional relationship of the detected host vehicle on the map data is set via the operation unit 5, the setting unit 13 may set the positional relationship of the detected target on the map data, based on the relative positional relationship between the host vehicle and the target. Further, in a case where the positional relationship of the detected target on the map data is set via the operation unit 5, the setting unit 13 may set the positional relationship of the detected host vehicle on the map data, based on the relative positional relationship between the host vehicle and the target.

When the automatic parking is performed, the parking assistance unit 14 initializes the position of the host vehicle on the map data set by the setting unit 13 as a parking start position. Then, the parking assistance unit 14 outputs control signals to various actuators mounted on the host vehicle so as to automatically park the host vehicle from the parking start position to the parking target position P1. The parking assistance unit 14 may be provided as a parking assistance device separately from the control device 1.

Figure 5:
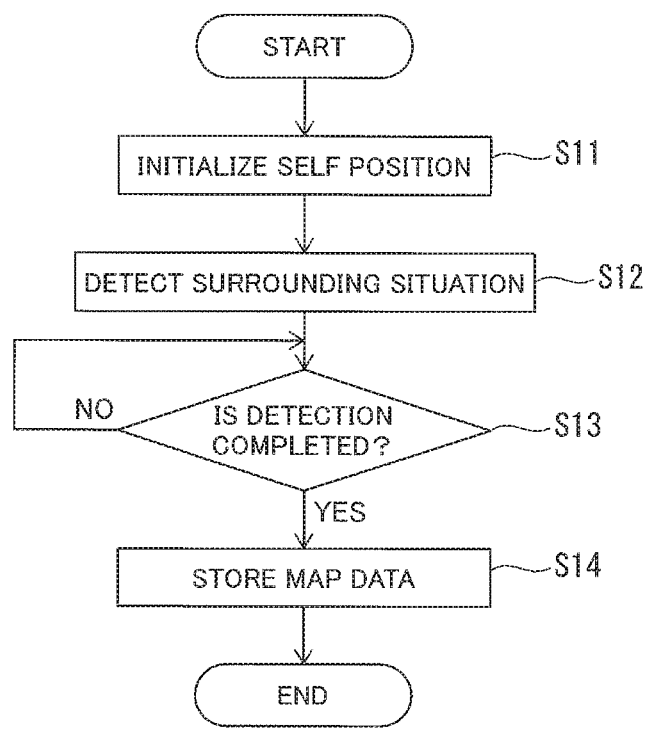
FIG. 5 is a flowchart describing an example of a method of generating map data according to the embodiment of the present invention.

Here, with reference to the flowchart of FIG. 5, an example of a method of generating map data stored in the storage device 2 will be described. In step S11, the current position of the host vehicle is initialized as the parking start position. In step S12, while the surrounding situation of the host vehicle is detected by the surrounding situation sensor 3, the host vehicle is parked from the parking start position to the parking target position P1. In step S13, it is determined whether or not the parking to the parking target position P1 has been completed and the detection of the surrounding situation has been completed. The detection of the surrounding situation of the host vehicle is continued by the surrounding situation sensor 3 until it is determined that the detection of the surrounding situation has been completed, and in a case where it is determined that the detection of the surrounding situation has been completed, the process proceeds to step S14. In step S14, map data is generated using the surrounding situation detected by the surrounding situation sensor 3, and the generated map data is stored in the storage device 2. Incidentally, the processing of the flowchart of FIG. 5 may be executed a plurality of times, and the map data obtained by integrating the map data obtained at each time may be adopted.

Next, an example of the self position estimation method according to the embodiment of the present invention will be described with reference to the flowchart of FIG. 6.

In step S20, the estimation unit 11 estimates the current position of the host vehicle based on global positioning system (GPS) signal or the like. Based on the estimated current position of the host vehicle, the estimation unit 11 specifies, from the data stored in the storage device 2, the map data around the parking target position P1 for use in automatic parking as illustrated in FIG. 2. As illustrated in FIG. 3, the surrounding situation sensor 3 detects the surrounding situation of the host vehicle.

In step S21, the estimation unit 11 determines whether or not the position of the host vehicle can be estimated (or whether or not it is easy to estimate the position) by determining whether or not a specific target (for example, the target 24) determined in advance as the surrounding situation of the host vehicle detected by the surrounding situation sensor 3 is detected. In a case where it is determined that the specific target is not detected and the position of the host vehicle cannot be estimated (or it is difficult to estimate the position), the process proceeds to step S22, where the fact that the position of the host vehicle cannot be estimated (or it is difficult to estimate the position) is presented to the occupant via voice, presentation or the like, and the process ends.

On the other hand, in step S21, in a case where the specific target is detected as the surrounding situation of the host vehicle detected by the surrounding situation sensor 3 and it is determined that the position of the host vehicle can be estimated (or it is easy to estimate the position), the process proceeds to step S23. In step S23, the estimation unit 11 presents the fact that the position of the host vehicle can be estimated (or it is easy to estimate the position) to the occupant via voice, presentation or the like. Further, the estimation unit 11 estimates the position of the host vehicle on the map data by collating (matching) the map data stored in the storage device 2 and the surrounding situation of the host vehicle detected by the surrounding situation sensor 3.

In step S24, as illustrated in FIG. 4A, the presentation control unit 12 causes the presentation unit 4 to present the image I1 which is the result of collating (matching) between the map data and the surrounding situation of the host vehicle. Further, the presentation control unit 12 presents the simulation vehicle 27 at the position of the host vehicle estimated by the estimation unit 11. Incidentally, in a case where the image I1 is presented in the presentation unit 4, the operation unit 5 receives an operation of setting the positional relationship between the map data and at least one of the host vehicle and the target. The occupant operates the operation unit 5 so as to set a correct positional relationship between the map data and the target or the simulation vehicle 27 (correct deviation in the positional relationship). When there is no positional deviation between the map data and the target or the simulation vehicle 27, the occupant may perform an operation to input the fact that the positional relationship between the map data and the target or the simulation vehicle 27 is correct. As illustrated in FIG. 4B or FIG. 4C, the presentation control unit 12 changes the presentation of the presentation unit 4, according to the operation information of the occupant.

In step S25, the presentation control unit 12 determines whether or not the operation of the occupant has been received via the operation unit 5. The presentation of the presentation unit 4 is continued until it is determined that the operation of the occupant has been received and, in a case where it is determined that the operation of the occupant has been received, the process proceeds to step S26.

In step S26, based on the operation information of the occupant, the setting unit 13 corrects a result of collating the surrounding situation of the host vehicle with the map data by the estimation unit 11, that is, the position of the host vehicle or the position of the target on the map data.

In step S27, the parking assistance unit 14 initializes the position of the host vehicle on the map data set by the setting unit 13 as the parking start position. The parking assistance unit 14 outputs control signals to various actuators mounted on the host vehicle so that the host vehicle is automatically parked from the parking start position to the parking target position, using the map data.

The self position estimation program according to an embodiment of the present invention causes a computer constituting the control device 1 to execute a procedure of the self position estimation method illustrated in FIG. 6. The self position estimation program according to the embodiment of the present invention can be stored in the storage device 2, for example.

As described above, according to the embodiment of the present invention, when the automatic parking is performed using the surrounding situation of the parking target position stored in the storage device 2 during the parking to the parking target position, the presentation control unit 12 presents the stored surrounding situation (map data) on the presentation unit 4. Then, the operation unit 5 receives an operation of setting a positional relationship between the stored surrounding situation, and the host vehicle and the target existing around the host vehicle. Then, the setting unit 13 sets the position of the host vehicle or the position of the target in the stored surrounding situation, based on the operation. Thus, regardless of the parking environment, the position of the host vehicle and the position of the target on the map can be accurately estimated. Therefore, accuracy of estimation of the parking start position is important during the automatic parking. However, since the parking start position can be estimated with high accuracy, a path from the parking start position to the parking target position can be calculated accurately and the host vehicle can be parked to the parking target position accurately.

Further, the estimation unit 11 estimates the position of the host vehicle or the target in the surrounding situation (map data) of the stored parking target position based on the surrounding situation of the host vehicle detected by the surrounding situation sensor 3. The presentation control unit 12 presents the position or the target of the host vehicle in the stored surrounding situation on the presentation unit 4 and presents the position or the target of the host vehicle in the detected surrounding situation on the presentation unit 4. The operation unit 5 receives an operation of associating the position of the host vehicle or the target in the stored surrounding situation with the position of the host vehicle or the target in the detected surrounding situation. As a result, while visually recognizing the presentation of the presentation unit 4, the occupant can perform an operation of setting so as to match the targets 21, 22, 23 and 24 on the map data and the point group 26 indicating the position of the corresponding target of the surrounding situation (point group data) of the host vehicle.

Further, the occupant can accurately grasp the relative positional relationship between the host vehicle and the surrounding situation of the host vehicle by adopting an overhead view image as the map data which is the surrounding situation stored in the storage device 2 and causing the presentation unit 4 to present the map data as the overhead view image. Further, the surrounding situation of the host vehicle detected by the surrounding situation sensor 3 may be presented in the presentation unit 4 as the overhead view image. In this case, the occupant can accurately grasp the relative positional relationship between the host vehicle and the surrounding situation of the host vehicle.

Further, the estimation unit 11 determines whether or not the specific target is detected for the surrounding situation of the host vehicle detected by the surrounding situation sensor 3 and, in a case where the specific target is detected, presents the detection of the specific target to the occupant. Thus, it is possible to detect the specific target and cause the occupant to easily grasp that the occupant is under an environment in which it is easy to estimate the position of the host vehicle from the relative positional relationship between the specific target and the host vehicle. On the other hand, in a case where the specific target has not been detected, the fact that the specific target has not been detected is presented to the occupant. Thus, it is possible to cause the occupant to easily grasp that the occupant is under an environment in which the specific target cannot be detected and it is difficult to estimate the position of the host vehicle.

Further, the estimation unit 11 detects (estimates) the relative positional relationship between the host vehicle and the target in the detected surrounding situation, depending on the surrounding situation of the host vehicle detected by the surrounding situation sensor 3. Then, in a case where the positional relationship in the stored surrounding situation of any of the detected host vehicle or target is set via the operation unit 5, the positional relationship in the stored surrounding situation of the other of the detected host vehicle or target is set based on the relative positional relationship between the host vehicle and the target. Thus, it is possible to accurately estimate the position of the host vehicle and the position of the target in the stored surrounding situation by using the relative positional relationship between the host vehicle and the target.

Figure 7A:
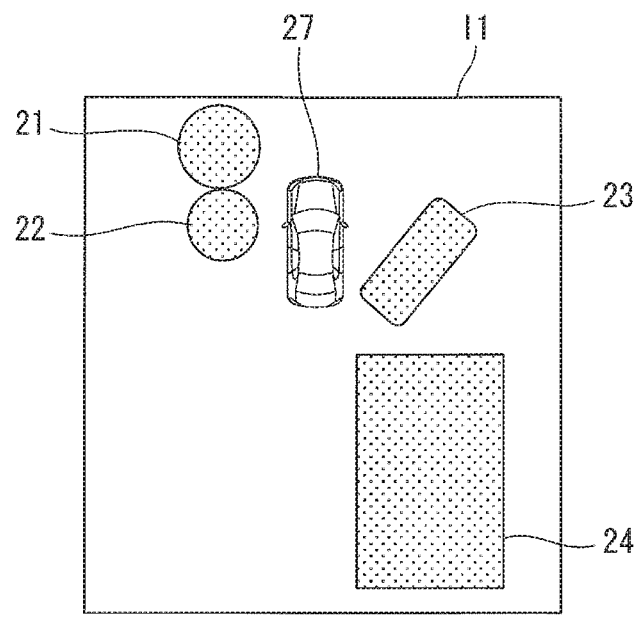
FIG. 7A is a schematic diagram illustrating an example of an image presented in a presentation unit according to a first modification of the embodiment of the present invention.

In the embodiment of the present invention, as illustrated in FIG. 4A, a case where the presentation unit 4 presents the image I1 obtained by superimposing the map data stored in the storage device 2 and the surrounding situation of the host vehicle detected by the surrounding situation sensor 3, has been described. In contrast, as illustrated in FIG. 7A, a first modification of the embodiment of the present invention differs from the embodiment of the present invention in that the surrounding situation of the host vehicle detected by the surrounding situation sensor 3 is not presented and only map data stored in the storage device 2 is presented. The map data includes targets 21, 22, 23 and 24. Further, as illustrated in FIG. 7A, a simulation vehicle 27 is presented at the position of the host vehicle on the map data estimated by the estimation unit 11.

Figure 7B:
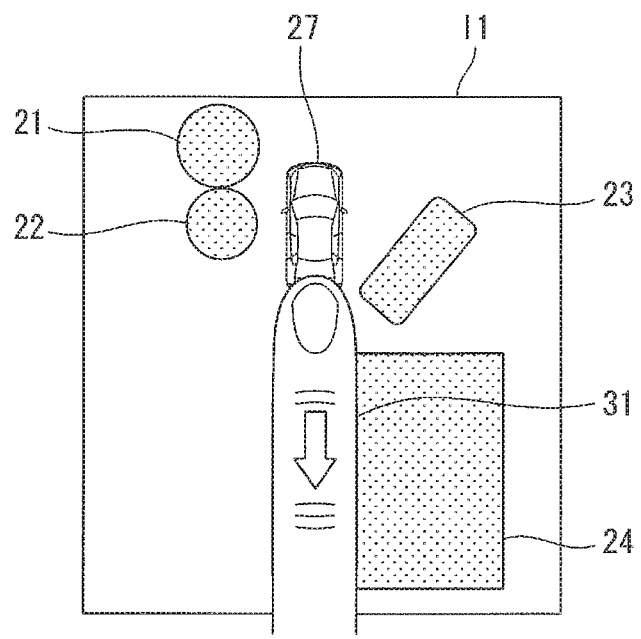
FIG. 7B is a schematic diagram illustrating an example of an operation on the image presented in the presentation unit according to the first modification of the embodiment of the present invention.

In this case, the occupant visually observes the actual surrounding situation of the host vehicle and grasps a correspondence relationship between the actual surrounding situation of the host vehicle and the presented map data. Then, in a case where the operation unit 5 is a touch panel, for example, as illustrated in FIG. 7B, the occupant drags the simulation vehicle 27 in a direction of an arrow (downward) with the finger 31 and drops the simulation vehicle 27 at a position on the map data corresponding to the position of the host vehicle in the actual surrounding situation of the host vehicle. Thus, the positional relationship between the map data and the host vehicle is set by moving the simulation vehicle 27 with respect to the map data. Incidentally, the occupant may set the positional relationship between the map data and the host vehicle by touching and scrolling one of the targets 21, 22, 23 and 24 on the map data and moving the entire map data including the targets 21, 22, 23 and 24 with respect to the simulation vehicle 27. The setting unit 13 corrects the position of the host vehicle on the map data estimated by the estimation unit 11 to the position corresponding to FIG. 7B based on the operation information of the occupant.

Incidentally, in FIG. 7A, a case where the simulation vehicle 27 is presented on the map data is exemplified, but the simulation vehicle 27 may not be presented on the map data. In this case, the occupant may set the position of the host vehicle on the map data by touching a position corresponding to the position of the host vehicle on the map data. A case where the simulation vehicle 27 is not presented on the map data, the surrounding situation of the host vehicle by the surrounding situation sensor 3 may not be detected, and the position of the host vehicle on the map data by the estimation unit 11 may not be estimated.

According to the first modification of the embodiment of the present invention, even in a case where only the map data is presented without presenting the surrounding situation of the host vehicle detected by the surrounding situation sensor 3, the occupant can set the positional relationship between the map data and the host vehicle correctly. Thus, the setting unit 13 can accurately estimate the position of the host vehicle on the map data by setting the position of the host vehicle on the map data based on the operation information of the occupant.

Figure 8A:
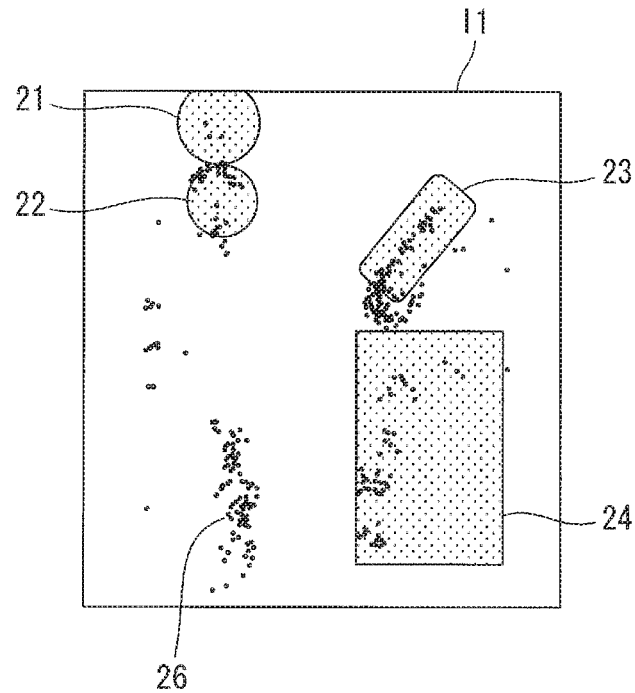
FIG. 8A is a schematic diagram illustrating an example of an image presented in a presentation unit according to a second modification of the embodiment of the present invention.

In the embodiment of the present invention, as illustrated in FIG. 4A, a case where the presentation unit 4 presents the image I1 obtained by superimposing the map data stored in the storage device 2 and the surrounding situation of the host vehicle detected by the surrounding situation sensor 3 and also presents the simulation vehicle 27, has been described. In contrast, as illustrated in FIG. 8A, a second modification of the embodiment of the present invention is the same as the embodiment of the present invention in that the image I1 obtained by superimposing the map data and the surrounding situation of the host vehicle is presented in the presentation unit 4, but differs from the embodiment of the present invention in that the simulation vehicle 27 is not presented.

Figure 8B:
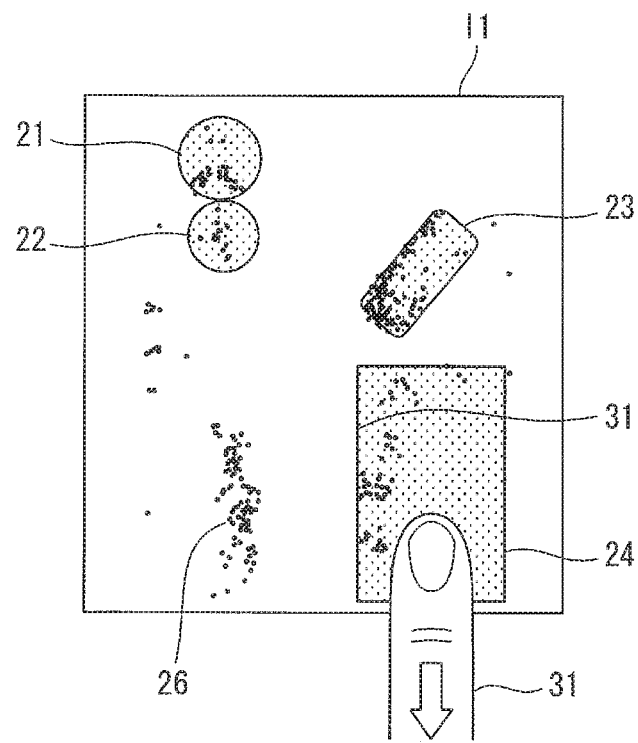
FIG. 8B is a schematic diagram illustrating an example of an operation on the image presented in the presentation unit according to the second modification of the embodiment of the present invention.

In this case, for example, as illustrated in FIG. 8B, the occupant matches the map data and the surrounding situation (point group data) of the host vehicle by touching and scrolling the target 24 on the map data in the direction of the arrow (downward) with the finger 31 to move the entire map data including the targets 21, 22, 23 and 24 in the downward direction. In addition, the occupant may match the map data and the surrounding situation (point group data) of the host vehicle by touching and scrolling an arbitrary portion of the point group 26 of the surrounding situation (point group data) of the host vehicle and moving the entire surrounding situation (point group data) of the host vehicle. The setting unit 13 sets the position of the host vehicle on the map data based on the operation information of the occupant.

According to the second modification of the embodiment of the present invention, even in a case where the simulation vehicle 27 is not presented, the occupant can set the positional relationship between the map data and the surrounding situation of the host vehicle by presenting the map data stored in the storage device 2 and the surrounding situation of the host vehicle detected by the surrounding situation sensor 3. Then, the setting unit 13 can accurately estimate the position of the host vehicle on the map data by setting the position of the host vehicle on the map data based on the operation information of the occupant.

In the embodiment of the present invention, as illustrated in FIG. 4A, a case where the point group data is used as the surrounding situation of the host vehicle detected by the surrounding situation sensor 3 has been described. On the other hand, as illustrated in FIG. 9A, a third modification of the embodiment of the present invention differs from the embodiment of the present invention in that camera image is used as the surrounding situation of the host vehicle detected by the surrounding situation sensor 3.

Figure 9A:
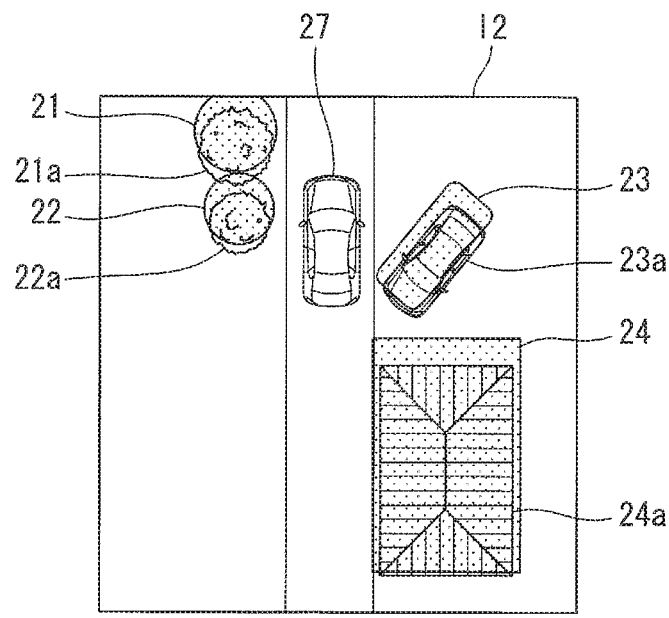
FIG. 9A is a schematic diagram illustrating an example of an image presented in a presentation unit according to a third modification of the embodiment of the present invention.
Figure 9B:
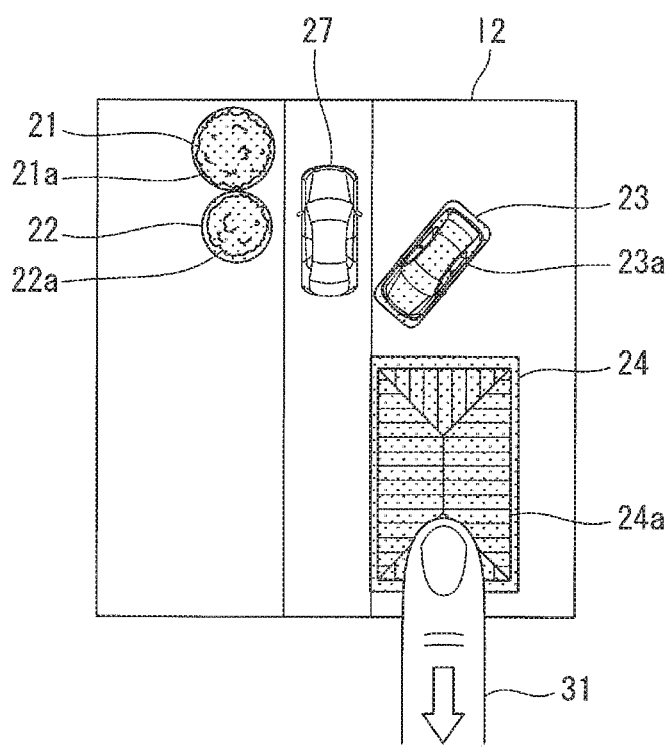
FIG. 9B is a schematic diagram illustrating an example of an operation on the image presented in the presentation unit according to the third modification of the embodiment of the present invention.

As illustrated in FIG. 9A, an image I2 obtained by superimposing the map data stored in the storage device 2 and the camera image as the surrounding situation of the host vehicle detected by the surrounding situation sensor 3 is presented in the presentation unit 4. The camera image includes the targets 21a, 22a, 23a and 24a, and these targets 21a, 22a, 23a and 24a correspond to the targets 21, 22, 23 and 24 of the map data stored in the storage device 2. In this case, for example, as illustrated in FIG. 9B, the occupant matches the map data and the camera image by touching and scrolling the target 24 on the map data in the direction of the arrow (downward) with the finger 31 to move the entire map data including the targets 21, 22, 23, and 24 downward. Incidentally, the occupant may match the camera image and the map data by touching and scrolling any one of the targets 21a, 22a, 23a and 24a of the camera image to move the entire camera image including the targets 21a, 22a, 23a and 24a.

According to the third modification of the embodiment of the present invention, it is easy for the occupant to intuitively grasp the positional relationship between the map data and the surrounding situation of the host vehicle by presenting the camera image as the surrounding situation of the host vehicle detected by the surrounding situation sensor 3, as compared with the case of presenting a CG image.

As a fourth modification of the embodiment of the present invention, a case where the position of the target of the surrounding situation of the host vehicle detected by the surrounding situation sensor 3 is individually set will be described. FIG. 10A is an image I3 of the map data stored in the storage device 2, and there are targets 41 and 42. FIG. 10B is an image I4 of the surrounding situation of the host vehicle detected by the surrounding situation sensor 3 and includes targets 41a and 42a. The targets 41a and 42a correspond to the targets 41 and 42 of the map data illustrated in FIG. 10A, but the position of the target 41a deviates from the actual position and is erroneously detected. In FIG. 10B, a simulation vehicle 43 is presented at the position of the host vehicle estimated by the estimation unit 11.

The presentation control unit 12 causes the presentation unit 4 to present the image I3 of the map data illustrated in FIG. 10A and the image I4 of the surrounding situation of the host vehicle illustrated in FIG. 10B side by side. As illustrated in FIG. 10C, the occupant performs an operation of setting the position of the target 41a by dragging the target 41a of the surrounding situation of the host vehicle in the direction of the arrow (right direction) with the finger 31 and dropping the target 41a at the correct position. The setting unit 13 sets (corrects) the position of the target 41a of the surrounding situation of the host vehicle detected by the surrounding situation sensor 3 based on the operation information of the occupant. Further, the setting unit 13 sets (corrects) the position of the host vehicle as illustrated in FIG. 10D based on the relative positional relationship between the corrected targets 41a and 42a and the host vehicle.

According to the fourth modification of the embodiment of the present invention, the position of the target in the surrounding situation of the host vehicle detected by the surrounding situation sensor 3 can be individually set, and the position of the host vehicle can be set based on the set surrounding situation of the host vehicle.

In the embodiment of the present invention, as illustrated in FIG. 4A, a case where the presentation unit 4 presents the image I1 obtained by superimposing the map data stored in the storage device 2 and the surrounding situation of the host vehicle detected by the surrounding situation sensor 3, has been described. On the other hand, as illustrated in FIG. 11A, a fifth modification of the embodiment of the present invention differs from the embodiment of the present invention in that the map data and the surrounding situation of the host vehicle are arranged side by side without being superimposed.

Figure 11A:
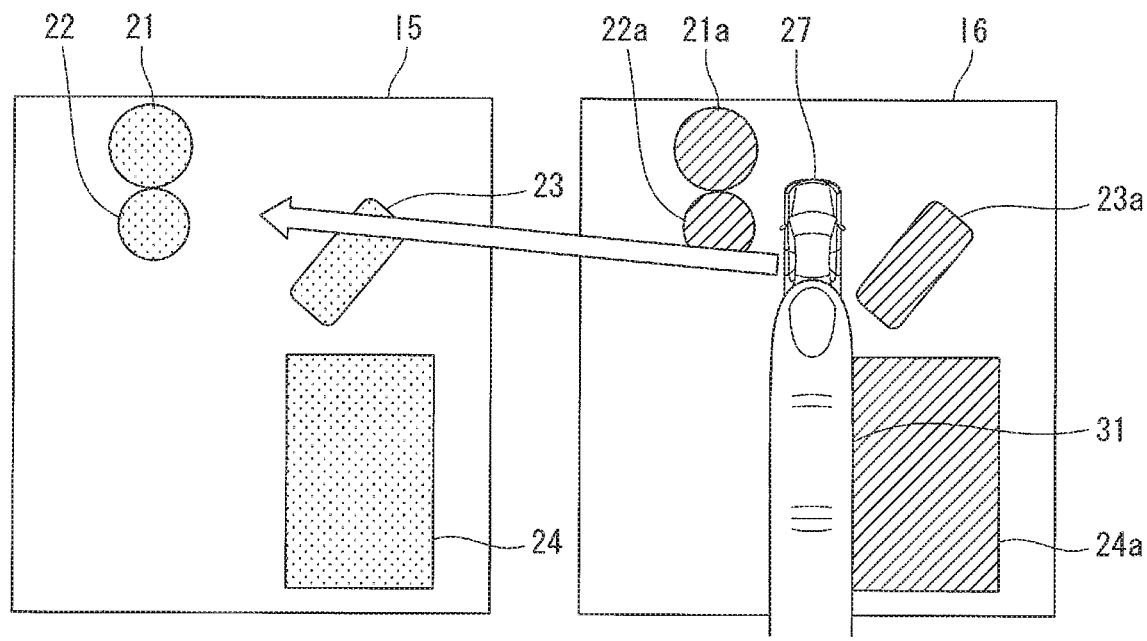
FIG. 11A is a schematic diagram illustrating an example of an image presented in a presentation unit according to a fifth modification of the embodiment of the present invention.

The left side of FIG. 11A is the image I5 of the map data stored in the storage device 2 and includes the targets 21, 22, 23 and 24. Incidentally, in the image I5 of the map data, a simulation vehicle representing the position of the host vehicle on the map data estimated by the estimation unit 11 may be presented. The right side of FIG. 11A is the CG image I6 of the surrounding situation of the host vehicle detected by the surrounding situation sensor 3 and includes the targets 21a, 22a, 23a and 24a. The CG image I6 of the surrounding situation of the host vehicle can be generated based on, for example, point group data or camera image. In the CG image I6 of the surrounding situation of the host vehicle, the simulation vehicle 27 is presented at the position of the host vehicle estimated by the estimation unit 11.

For example, as illustrated in FIG. 11A, the occupant sets the position of the host vehicle on the map data by dragging the simulation vehicle 27 of the image I6 of the surrounding situation of the host vehicle on the right side and moving the simulation vehicle 27 as indicated by an arrow to drop the simulation vehicle 27 at the position on the image I5 of the map data on the left side. The setting unit 13 sets the position to which the simulation vehicle 27 on the map data is dragged as the position of the host vehicle based on the operation information of the occupant.

Figure 11B:
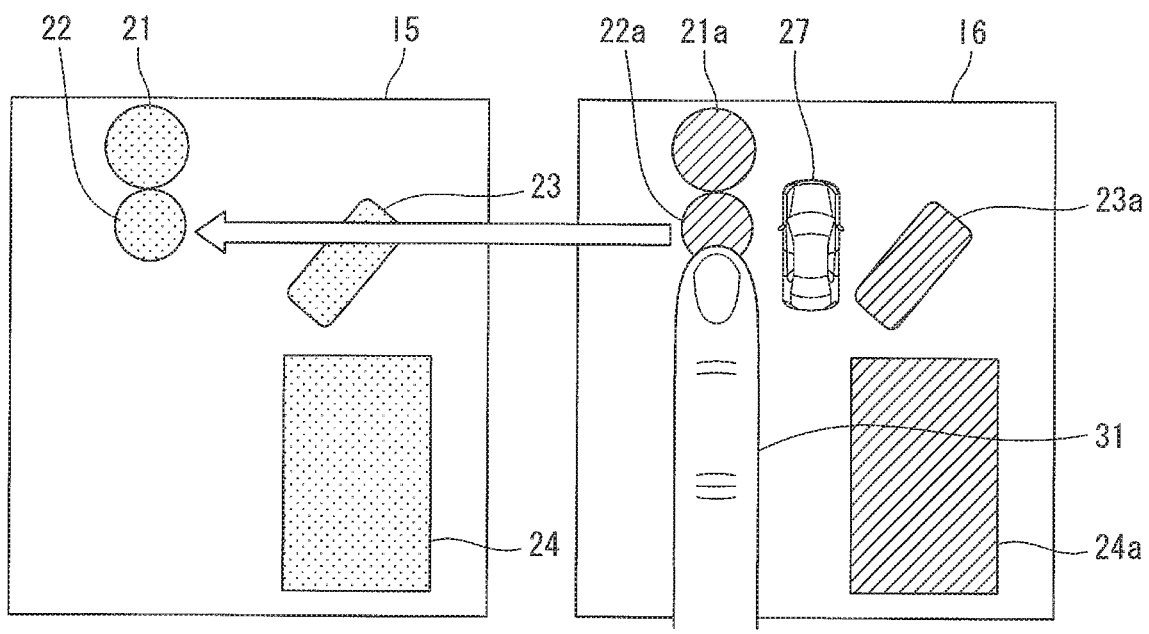
FIG. 11B is a schematic diagram illustrating an example of an operation on the image presented in the presentation unit according to the fifth modification of the embodiment of the present invention.

Alternatively, as illustrated in FIG. 11B, the occupant may set the target 22a of the surrounding situation of the host vehicle to match the target 22 of the map data by dragging the target 22a of image I6 of the surrounding situation of the host vehicle on the right side and moving the target 22a as indicated by the arrow to drop the target 22a at the position of the target 22 of the image I6 of the map data on the left side. Based on the operation information of the occupant, the setting unit 13 corrects a result of collating (matching) the map data and the surrounding situation of the host vehicle so that the position of the target 22 of the map data matches the position of the target 22a of the surrounding situation of the host vehicle. Further, the setting unit 13 corrects the position of the host vehicle on the map data estimated by the estimation unit 11, based on the result of collating (matching) the corrected map data and the surrounding situation of the host vehicle.

According to the fifth modification of the embodiment of the present invention, even in a case where the map data stored in the storage device 2 and the surrounding situation of the host vehicle detected by the surrounding situation sensor 3 are presented side by side, it is possible for the occupant to set the positional relationship between the map data and the surrounding situation of the host vehicle or the host vehicle. Then, the setting unit 13 can accurately estimate the position of the host vehicle on the map data by correcting the position of the host vehicle on the map data estimated by the estimation unit 11 based on the operation information of the occupant.

In the embodiment of the present invention, as illustrated in FIG. 4A, a case where the presentation unit 4 presents the overhead view image I1 obtained by superimposing the map data stored in the storage device 2 and the surrounding situation of the host vehicle detected by the surrounding situation sensor 3, has been described. On the other hand, as illustrated in FIG. 12A, a sixth modification of the embodiment of the present invention differs from the embodiment of the present invention in that a front image I7 obtained by superimposing the map data stored in the storage device 2 and the surrounding situation of the host vehicle detected by the surrounding situation sensor 3 is presented.

Figure 12A:
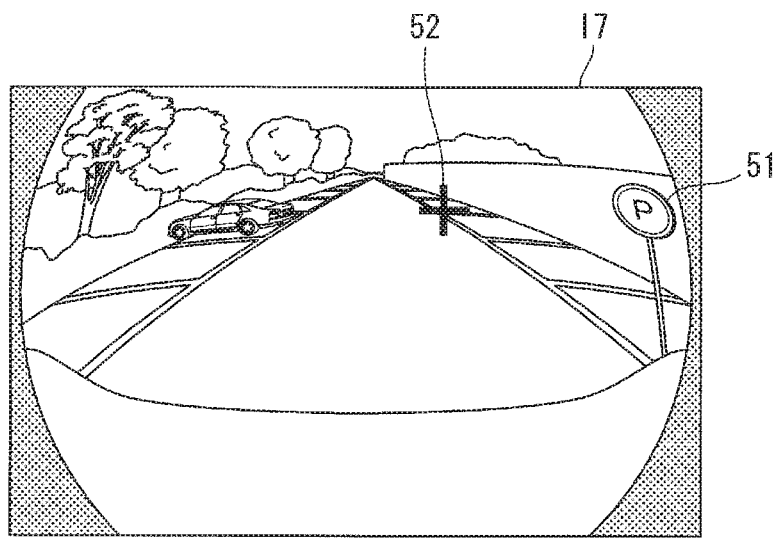
FIG. 12A is a schematic diagram illustrating an example of an image presented in a presentation unit according to a sixth modification of the embodiment of the present invention.

As illustrated in FIG. 12A, the map data stored in the storage device 2 includes a cross mark 52 corresponding to a marker 51. In FIG. 12A, the surrounding situation of the host vehicle detected by the surrounding situation sensor 3 includes a parking frame and the marker 51. When the estimation unit 11 collates (matches) the map data stored in the storage device 2 and the surrounding situation of the host vehicle detected by the surrounding situation sensor 3, the estimation unit 11 erroneously recognizes a puddle and the like detected by the surrounding situation sensor 3 as the marker 51, such that the cross mark 52 of the map data stored in the storage device 2 and the position of the marker 51 are aligned to be relatively deviated from each other.

Figure 12B:
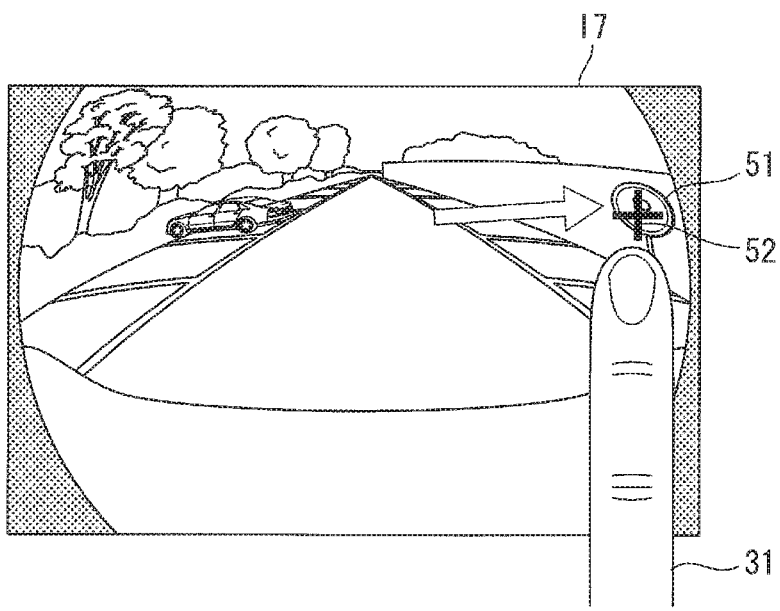
FIG. 12B is a schematic diagram illustrating an example of an operation on the image presented in the presentation unit according to the sixth modification of the embodiment of the present invention.

As illustrated in FIG. 12B, the occupant sets the cross mark 52 to match the marker 51 by dragging the cross mark 52 of the map data with a finger and dropping the cross mark 52 at the position of the marker 51. Based on the operation information of the occupant, the setting unit 13 corrects the result of collating (matching) the map data and the surrounding situation of the host vehicle so that the position of the cross mark 52 of the map data matches the position of the marker 51. Further, the setting unit 13 corrects the position of the host vehicle on the map data estimated by the estimation unit 11 based on the result of collating (matching) the corrected map data and the surrounding situation of the host vehicle.

According to the sixth modification of the embodiment of the present invention, even in a case where the front image I7 obtained by superimposing the map data stored in the storage device 2 and the surrounding situation of the host vehicle detected by the surrounding situation sensor 3 is presented, the occupant can set the positional relationship between the map data and the surrounding situation of the host vehicle. Then, the setting unit 13 can estimate the position of the host vehicle on the map data accurately by correcting the position of the host vehicle on the map data estimated by the estimation unit 11 based on the operation information of the occupant.

As described above, the invention has been described according to the embodiments, but it should not be understood that the description and drawings forming a part of this disclosure limit the invention. Various alternative embodiments, examples and operational techniques will be apparent to those skilled in the art in view of this disclosure.

In the embodiment of the present invention, a case where the map data is presented as the CG image and the surrounding situation of the host vehicle detected by the surrounding situation sensor 3 is presented as point group data has been described, but the invention is not limited thereto. For example, the map data may be presented as a camera image and the surrounding situation of the host vehicle detected by the surrounding situation sensor 3 may be presented as the camera image. Alternatively, the map data may be presented as the camera image and the surrounding situation of the host vehicle detected by the surrounding situation sensor 3 may be presented as the CG image. Alternatively, the map data may be presented as the CG image and the surrounding situation of the host vehicle detected by the surrounding situation sensor 3 may be presented as the camera image.

Further, in the embodiment of the present invention, a case where the presentation unit 4 is the display has been described, but the presentation unit 4 may be a device other than the display. For example, in a case where the presentation unit 4 is a speaker, the presentation unit 4 can present to the occupant the surrounding situation of the stored parking target position or the surrounding situation of the host vehicle detected by the surrounding situation sensor 3 by outputting a voice that describes the surrounding situation of the stored parking target position or the surrounding situation of the host vehicle detected by the surrounding situation sensor 3.

As described above, it goes without saying that the invention includes various embodiments and the like not described herein. Therefore, the technical scope of the invention is determined by only the invention-specifying matters pertaining to the claims proper in view of the above description.

REFERENCE SIGNS LIST

1 CONTROL DEVICE
2 STORAGE DEVICE
3 SURROUNDING SITUATION SENSOR
4 PRESENTATION UNIT
5 OPERATION UNIT
11 ESTIMATION UNIT
12 PRESENTATION CONTROL UNIT
13 SETTING UNIT
14 PARKING ASSISTANCE UNIT

The invention claimed is:

1. A self position estimation method of a parking assistance device that stores surrounding situation of a parking target position in a storage device and executes automatic parking using the stored surrounding situation during parking to the parking target position, the method comprising:
presenting the stored surrounding situation;
receiving from an occupant an operation of setting a positional relationship between the stored surrounding situation, and a host vehicle and an object existing around the host vehicle before starting the automatic parking; and
setting a position of the host vehicle or a position of the object in the stored surrounding situation based on the operation received from the occupant.

2. The self position estimation method of claim 1, further comprising:
detecting surrounding situation of the host vehicle; and
estimating the position of the host vehicle or the object in the stored surrounding situation based on the detected surrounding situation,
wherein the presenting presents the position of the host vehicle or the object in the stored surrounding situation and presents the position of the host vehicle or the object in the detected surrounding situation, and
wherein the receiving receives an operation of associating the position of the host vehicle or the object in the stored surrounding situation with the position of the host vehicle or the object in the detected surrounding situation.

3. The self position estimation method of claim 2, wherein the stored surrounding situation or the detected surrounding situation is presented as an overhead view image.

4. The self position estimation method of claim 2, further comprising:
determining whether or not a predetermined specific object is detected as the detected surrounding situation; and
presenting detection of the specific object to the occupant in a case where the specific object is detected.

5. The self position estimation method of claim 2, further comprising:
detecting a relative positional relationship between the host vehicle and the object in the detected surrounding situation according to the surrounding situation of the host vehicle,
wherein the setting the position of the host vehicle or the position of the object sets a positional relationship in the stored surrounding situation of the other of the detected host vehicle or object based on the relative positional relationship, in a case where a positional relationship in the stored surrounding situation of any one of the detected host vehicle or the object is set.

6. The self position estimation method of claim 1, wherein the object existing around the host vehicle includes a line on a road.

7. A self position estimation device of a parking assistance device configured to store surrounding situation of a parking target position in a storage device and execute automatic parking using the stored surrounding situation during parking to the parking target position, the self position estimation device comprising:
a display or speaker configured to present the stored surrounding situation;
an interface configured to receive from an occupant an operation of setting a positional relationship between the stored surrounding situation, and a host vehicle and an object existing around the host vehicle when the stored surrounding situation is presented before starting the automatic parking; and
a controller configured to set a position of the host vehicle or a position of the object in the stored surrounding situation based on the operation received from the occupant.

* * * * *